United States Patent
Oka

(10) Patent No.: US 7,489,487 B2
(45) Date of Patent: Feb. 10, 2009

(54) MULTI-LEVEL POWER CONVERTER

(75) Inventor: Toshiaki Oka, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 352 days.

(21) Appl. No.: 11/391,372

(22) Filed: Mar. 29, 2006

(65) Prior Publication Data
US 2007/0159749 A1 Jul. 12, 2007

(30) Foreign Application Priority Data
Jan. 10, 2006 (JP) ............................. 2006-002375

(51) Int. Cl.
H02H 3/00 (2006.01)
(52) U.S. Cl. ...................... 361/79; 361/30; 361/86; 361/87; 361/93.1
(58) Field of Classification Search ............... 361/93.1, 361/30, 79, 86–87; 363/56.03, 56.07, 56.1
See application file for complete search history.

(56) References Cited

U.S. PATENT DOCUMENTS

| 4,819,157 | A | * | 4/1989 | Hirose et al. ............. 363/56.03 |
| 5,210,479 | A | * | 5/1993 | Kimura et al. ............. 318/727 |
| 5,608,595 | A | * | 3/1997 | Gourab et al. ............. 361/79 |
| 6,091,615 | A | * | 7/2000 | Inoshita et al. ............. 363/98 |
| 6,851,077 | B2 | * | 2/2005 | Herzer et al. ............. 714/718 |
| 7,016,207 | B2 | * | 3/2006 | Yamanaka et al. ............. 363/98 |
| 7,136,269 | B2 | * | 11/2006 | Iimura et al. ............. 361/93.7 |
| 2004/0174723 | A1 | * | 9/2004 | Yamanaka et al. ............. 363/37 |

FOREIGN PATENT DOCUMENTS

| JP | 60-83418 | 5/1985 |
| JP | 2000-354383 | 12/2000 |

* cited by examiner

Primary Examiner—Michael J Sherry
Assistant Examiner—Terrence R Willoughby
(74) Attorney, Agent, or Firm—Oblon, Spivak, McClelland, Maier & Neustadt, P.C.

(57) ABSTRACT

A multi-level power converter is disclosed. The converter includes a DC power source having N (N is an Integer more than two)-level voltage potentials, and a plurality of switching legs connected in parallel to the DC power source. The switching leg has switching elements in series connection, and clamp diodes connected between intermediate DC potential terminals to middle points of the switching legs. The converter is provided with a control means for supplying gate pulses to the switching elements, and a supervising means for supervising every switching element to output a failure signal. The converter further includes a logic operating means for detecting an over-current failure of main circuit elements to output a device fault signal using the failure signals An operation of the logic operating means at least includes AND condition of at least two failure signals to output the device fault signal.

18 Claims, 14 Drawing Sheets

MULTI-LEVEL POWER CONVERTER

CROSS REFERENCE TO RELATED APPLICATION

This application is based upon and claims the benefit of priority from the prior Japanese Patent Application No. 2006-002375, filed on Jan. 10, 2006, the entire contents of which are incorporated herein by reference.

BACKGROUND OF THE INVENTION

1. Field of the Invention

The present invention relates to a multi-level power converter which has an improved detection function of an over-current failure.

2. Description of the Background

A two-level inverter has been used as a power converter to change a DC power into an AC power. Recently, needs of large capacity power converter with high voltage are expanded. So-called multi-level inverter equipment having three or more voltage potentials become to be used for example, for a motor drive application.

Three-level inverter equipment is one which outputs three DC voltage potentials. On the other hand, the conventional two-level inverter equipment outputs two DC voltage potentials. In the two-level inverter, switching legs in each of which two switching elements are in-series connected, are connected in parallel to the DC power supply. An AC output is obtained from central points of the switching legs. In three-level inverter, four switching elements connected in-series constituting switching legs are connected to a DC power supply with positive, zero, and negative voltage potentials. An AC output is obtained from central points of the switching legs. The both ends of the switching legs of the three-level inverter are connected to positive and negative terminals of DC power supply, and negative terminal of positive end of the switching element and positive terminal of negative end of the switching element are clamped in zero voltage potential through a clamp diode, respectively. A flywheel diode is anti-parallel connected to every switching element constituting a switching leg.

By making a parallel connection of two switching legs, a single-phase AC output can be obtained. A three phase AC output can be obtained by making a parallel connection of three switching legs at either of two-level or three-level inverter.

In a conventional two-level inverter equipment, when any one of the voltages between positive and negative terminals of switching elements exceeds a threshold voltage level during a period of its ON-state, a method of performing reduction of gate voltage or blocking gate signal has been used for the purpose of over-current protection of a switching element.

That is, when an on-pulse is given to a gate terminal of a switching element in the state of normal operation, the voltage between positive and negative terminals of the switching element decreases to saturation voltage with some delay time. Since there is an internal resistance of the switching element during a period of its ON-state, the voltage between positive and negative terminals of the switching element does not decrease when an over-current flows by a short circuit failure. Therefore, an over-current protection of the equipment can be attained by supervising the voltage of positive and negative terminals of the switching element after the predetermined delay time when an on-pulse is given to the switching element.

A proposal, which applied above mentioned viewpoint to three-level inverter equipment, is made in Japanese Patent Publication (Kokai) No. 2000-354383.

In the equipment shown in the above patent publication, a simplified circuit constitution is obtained because any over-current detectors is not used. But the delay of time is needed to accomplish an over-current protection of the equipment as mentioned above. Further, it is difficult to adjust the delay time. Because a decreasing speed of the voltage between positive and negative terminals of the switching element might be changed or affected by a transient characteristic of the switching element and a load characteristic. Furthermore, in a free-back mode at a middle part of the switching leg, it is difficult to detect an abnormally high voltage between positive and negative terminals of a switching element during a period of its ON-state, because positive current does not flows through the switching element at that time.

SUMMARY OF THE INVENTION

An advantage of an aspect of the present invention is to provide a multi-level power converter that can detect an over-current failure caused by main circuit elements more rapidly and with high reliability.

According to an aspect of the invention, a multi-level power converter is provided, which includes a DC power source having N terminals with N-level voltage potentials, wherein N is an Integer more than two; a plurality of switching legs connected in parallel to the DC power source having, 2(N-1) switching elements connected in series, and 2(N-2) clamp diodes connected between (N-2) intermediate DC potential terminals and middle points of the switching legs respectively, in order to clamp the potential of the middle points of the switching legs; a control means for supplying gate pulses to the switching elements so that a N-level phase voltage may be obtained from a central point of each of the switching legs; a supervising means for supervising the switching elements to output a failure signal when a voltage between positive and negative terminals of each of the switching elements exceeds a predetermined threshold voltage level during a period of its ON-state; and a logic operating means for detecting an over-current failure of main circuit elements to output a device fault signal using the failure signals from the supervising means; wherein an operation of the logic operating means at least includes AND condition of at least two failure signals.

DETAILED DESCRIPTION OF THE INVENTION

Embodiments of the present invention will be described below in detail with reference to the drawings.

FIRST EMBODIMENT

Figure 1:
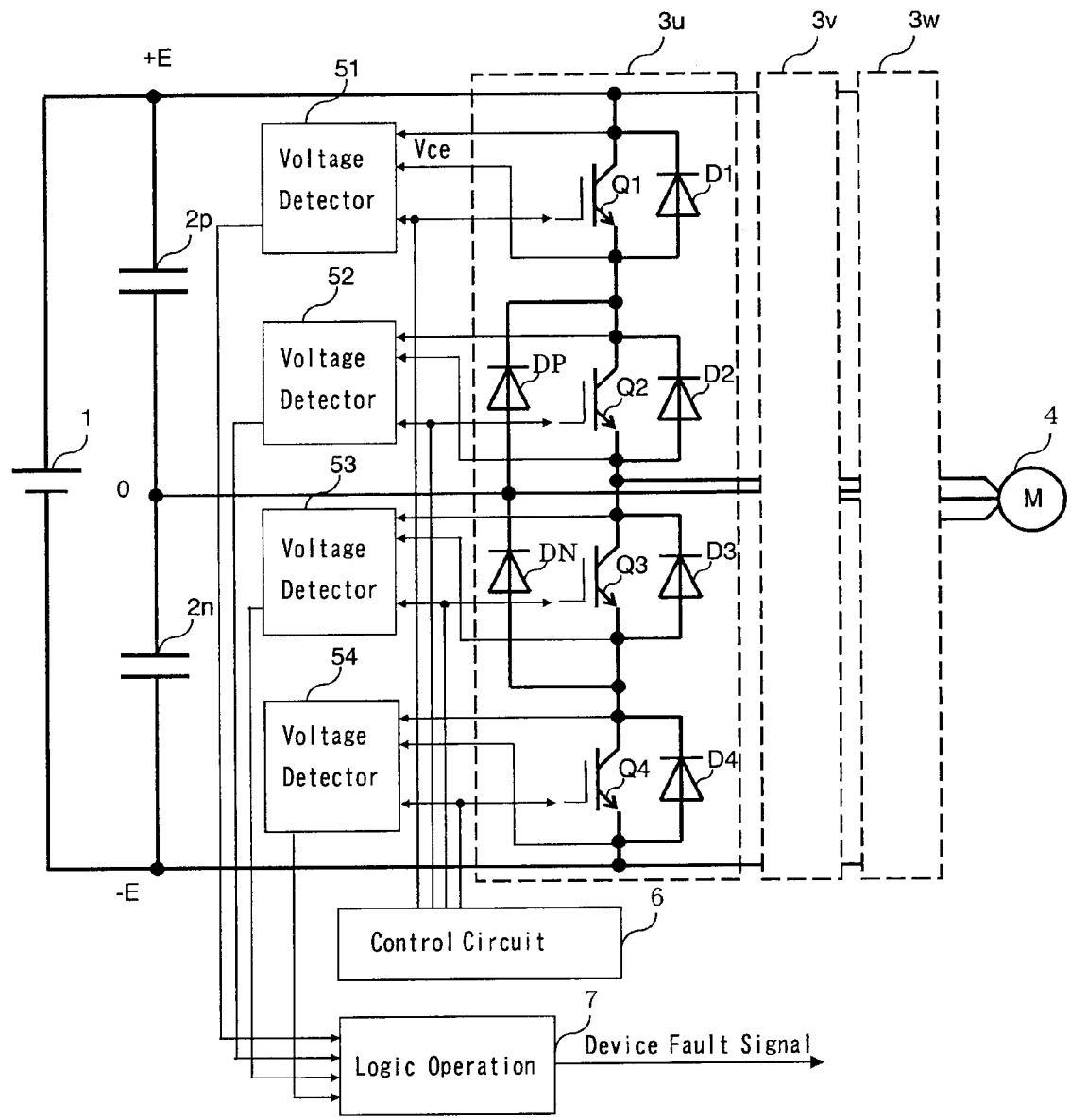
FIG. 1 shows a circuit diagram relating a first embodiment of a multi-level power converter of the present invention.

With reference to FIGS. 1 to 7, a multi-level power converter of the first embodiment according to the invention is explained. FIG. 1 shows a circuit diagram of the power converter relating to the first embodiment of the present invention.

A DC voltage obtained from a DC power supply 1 is supplied to a series circuit consists of DC capacitors 2p and 2n having same capacitance. The DC power supply 1 has the voltage of 2E. Therefore, when positive side voltage potential of DC capacitor 2p is +E, negative side voltage potential of DC capacitor 2n is −E, and a voltage potential of central terminal of the DC capacitors 2p and 2n is 0 potential.

These three voltage potentials +E, −E and 0 are supplied to the switching legs 3u, 3v, and 3w. In FIG. 1, the internal composition of switching leg 3u is illustrated. Since the internal composition of other switching legs 3v and 3w are fundamentally same composed as that of switching leg 3u, those illustrations and explanations are omitted.

Switching leg 3u is composed of four switching elements Q1, Q2, Q3 and Q4 connected in series by which diodes D1, D2, D3, and D4 are anti-parallel connected respectively, a clamp diode DP connected between a central point of the switching elements Q1 and Q2, and a central terminal of the capacitors 2p and 2n, and a clamp diode DN connected between a central point of the switching elements Q3 and Q4, and a central terminal of the capacitors 2p and 2n. A positive terminal of the switching element Q1 and a negative terminal of the switching element Q4 are connected to +E potential terminal and −E potential terminal of the DC power supply 1, respectively.

Since the switching element Q1 and the switching element Q4 form ends of switching leg 3u, they are called the switching elements of both ends. On the other hand, since the switching element Q2 and the switching element Q3 form the middle part of switching leg 3u, they are called the switching elements of a middle part. And the switching elements, flywheel diodes, and clamp diodes constituting the switching leg are called main circuit elements.

Gate pulses are given to gate terminals of the switching elements Q1, Q2, Q3, and Q4 constituting switching leg 3u from a control circuit 6. And the switching elements Q1, Q2, Q3, and Q4 output desired U-phase output voltage at a central point of the switching elements Q2 and Q3, for example by PWM control. This U-phase output voltage is supplied to a primary winding of an AC motor 4. Similarly, V-phase output voltage and W-phase output voltage are supplied to the primary winding of the AC motor 4 from the switching legs 3v and 3w, respectively.

The voltages Vce between positive and negative terminals of the switching elements Q1, Q2, Q3, and Q4 are given to the voltage detectors 51, 52, 53, and 54, respectively. Gate pulses for the switching elements are also supplied to these voltage detectors 51, 52, 53, and 54 from the control circuit 6. Outputs from the voltage detectors 51, 52, 53, and 54 are given to a logic operation circuit 7. In the logic operation circuit 7, over-current failure of the switching elements and the diodes in switching leg 3u is detected by performing an adequate logic operation mentioned later. A voltage Vce of each switching element constituting switching legs 3v and 3w also is supervised with another voltage detector, but illustration is omitted.

Figure 2:
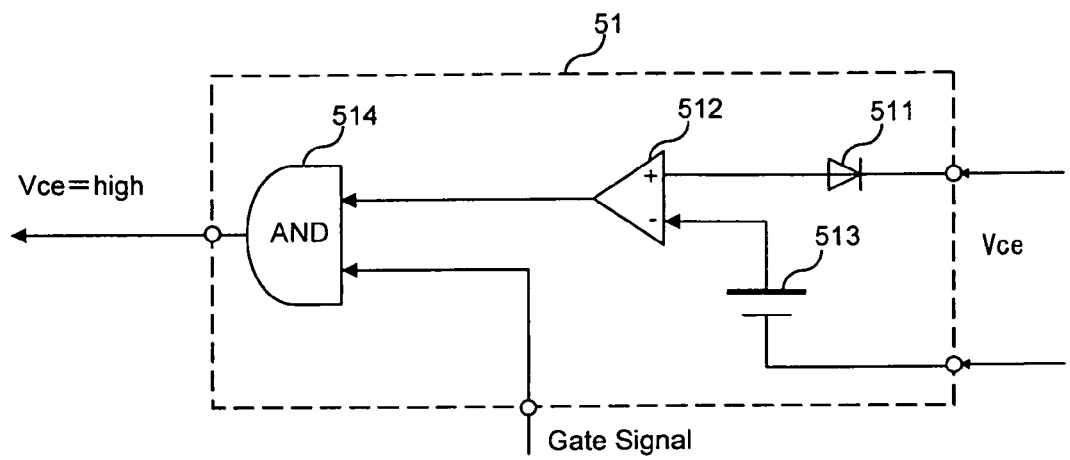
FIG. 2 shows an internal circuit diagram of a voltage detector applied to the first embodiment of a multi-level power converter according to the present invention.

FIG. 2 shows an internal circuit diagram of the voltage detector 51. A positive potential side of the voltage Vce between positive and negative terminals of the switching element Q1 is connected to one input terminal of a comparator 512 through the diode 511 for reverse current protection. A negative potential side of voltage Vce is connected to another input terminal of the comparator 512 through voltage bias 513 for setting predetermined threshold voltage level. When voltage Vce becomes higher than the threshold voltage level, the comparator 512 outputs 1. The output of the comparator 512 is given to one input terminal of AND circuit 514. The gate pulse for switching element Q1 obtained from the control circuit 6 is given to another input terminal of AND circuit 514. Thus, a "high" signal of the voltage Vce between positive and negative terminals of the switching element Q1 during a period of its ON-state is detected.

In this case of the first embodiment, a composition of the voltage detector 51 should be applied to all switching elements in the switching legs. Therefore, the voltage detector 52, 53, and 54 also serve as the same composition as the voltage detector 51.

Figure 3:
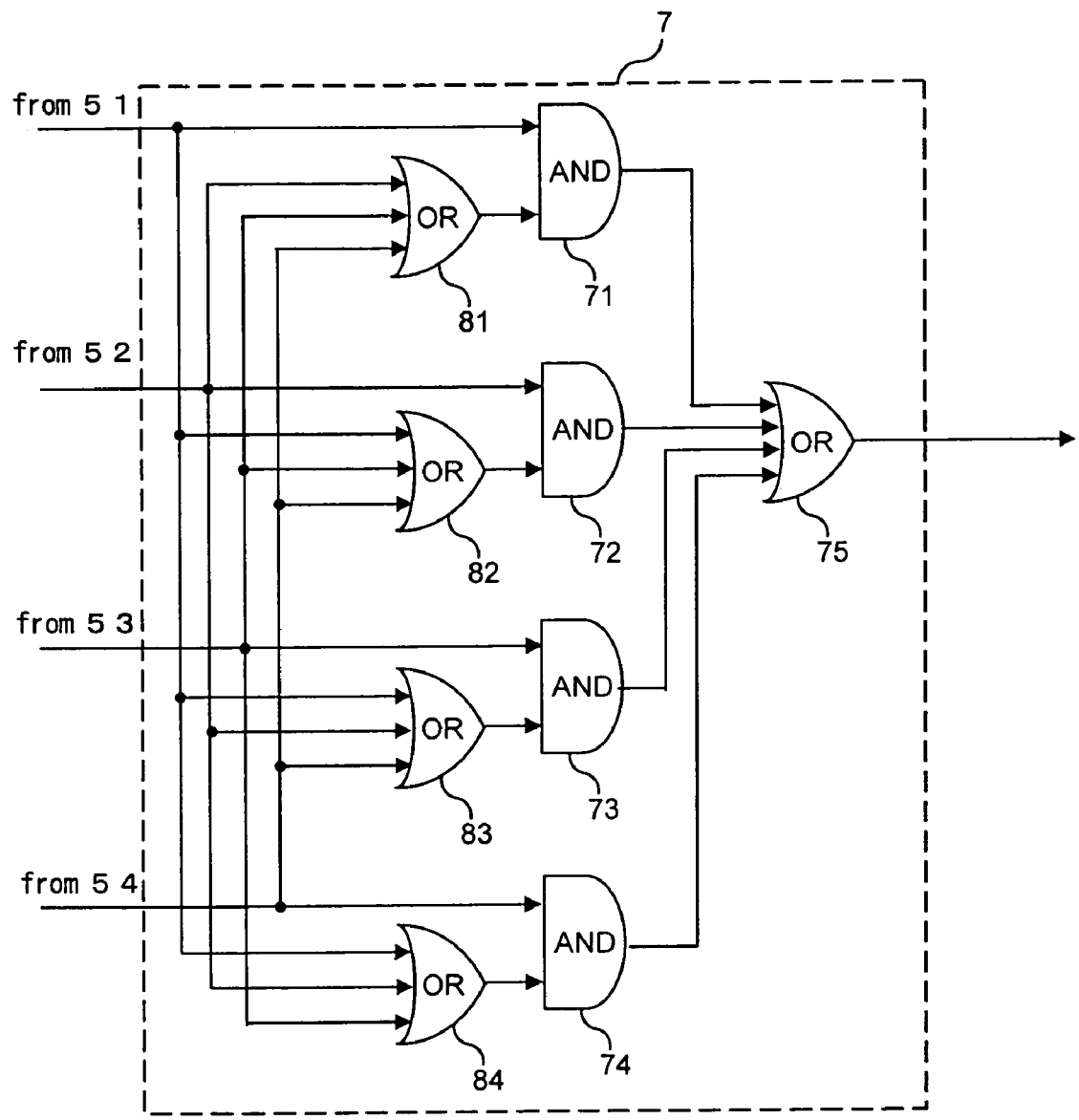
FIG. 3 shows a circuit diagram of a logic operation circuit applied to the first embodiment of a multi-level power converter according to the present invention.

FIG. 3 shows an internal circuit diagram of the logic operation circuit 7 shown in FIG. 1. Output signals from the voltage detector 51, 52, 53, and 54 are given directly to input terminals of AND circuits 71, 72, 73, and 74, respectively. Output signals from OR circuits 81, 82, 83, and 84 are given to other input terminals of AND circuits 71, 72, 73, and 74, respectively. Three signals other than the output signal from the voltage detector 51 i.e., output signals from the voltage detector 52, 53, and 54, are given to input terminals of OR circuit 81. Three signals other than the output signal from the voltage detector 52, 53, and 54 are similarly given to input terminals of OR circuit 82, 83, and 84, respectively. And the output signals from AND circuits 71, 72, 73, and 74 is given to OR circuit 75. Thus, when any of at least two signals are set to 1 among the output signals from the voltage detector 51, 52, 53, and 54, the output from OR circuit 75, i.e., an output from the operation circuit 7, is set to 1 as the Device Fault Signal.

Hereafter, with reference to short circuit modal analysis diagrams of FIGS. 4 to 7, operation principle of the first embodiment will be explained.

Figure 4:
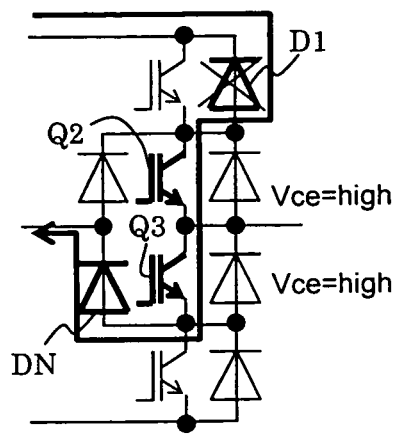
FIGS. 4 to 7 show short circuit modal analysis diagrams relating the first embodiment of a multi-level power converter of the present invention.

FIG. 4 shows a current route of a short-circuit current when the flywheel diode D1 in a switching leg changes into a short circuit state. Since a parallel connection of the flywheel diode D1 and the switching element Q1 is made, the following arguments are applied also when the switching element Q1 changes into a short circuit state.

As shown in FIG. 4, when the switching elements Q2 and Q3 are in there ON-states simultaneously, a short circuit current flows by a route of +E potential terminal to D1 (or Q1), Q2, Q3, DN, and 0 potential terminal. Therefore, when the voltages Vce between positive and negative terminals of both switching element Q1 and Q2 exceed a threshold voltage level during a period of there ON-states, it can be judged with the flywheel diode D1 or the switching element Q1 having changed into the short circuit state.

Here, the reason why a time delay element which was conventionally necessary becomes unnecessary in the circuit of the voltage detector 51 shown in FIG. 2 is explained. As mentioned above, to detect an over-current failure of the flywheel diode D1 or the switching element Q1, both voltages Vce of switching elements Q2 and Q3 exceeding a threshold voltage level during a period of there ON -state are needed. Since the switching elements Q2 and Q3 do not change from an OFF-state to an ON-state simultaneously, even if any one of the switching elements Q2 and Q3 is at the beginning of its ON-state and the voltage Vce exceeds the threshold level, the voltage Vce of another switching element will not exceed a threshold voltage level. Therefore, a time delay element may be omitted and the over-current failure can be detected quickly.

Figure 5:
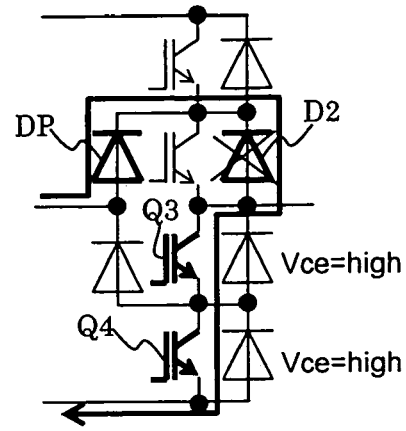

FIG. 5 shows the current route of a short-circuit current when the flywheel diode D2 or the switching element Q2 in a switching leg changes into a short circuit state. As shown in FIG. 5, when the switching elements Q3 and Q4 are in there ON-states simultaneously, a short circuit current flows by a route of 0 potential terminal. to DP, D2 (or Q2), Q3, Q4, and −E potential terminal. Therefore, when the voltages Vce between positive and negative terminals of both switching element Q3 and Q4 exceed a threshold voltage level during a period of there ON-states, it can be judged with the flywheel diode D2 or the switching element Q2 having changed, into the short circuit state.

Figure 6:
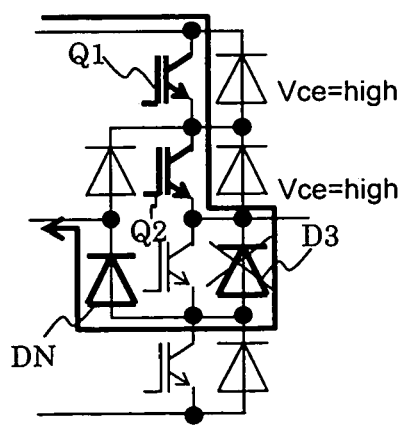

FIG. 6 shows the current route of a short-circuit current when the flywheel diode D3 or the switching element Q3 in a switching leg changes into a short circuit state. As shown in FIG. 6, when the switching elements Q1 and Q2 are in there ON-states simultaneously, a short circuit current flows by a route of +E potential terminal to Q1, Q2, D3(or Q3), DN, and 0 potential terminal. Therefore, when the voltages Vce between positive and negative terminals of both switching element Q1 and Q2 exceed a threshold voltage level during a period of there ON-states, it can be judged with the flywheel diode D3 or the switching element Q3 having changed into the short circuit state.

Figure 7:
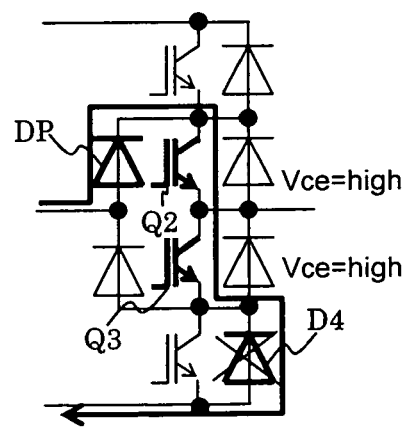

FIG. 7 shows the current route of a short-circuit current when the flywheel diode D4 or the switching element Q4 in a switching leg changes into a short circuit state. As shown in FIG. 7, when the switching elements Q2 and Q3 are in there ON-states simultaneously, a short circuit current flows by a route of 0 potential terminal to DP, Q2, Q3, D4 (or Q4), and −E potential terminal. Therefore, when the voltages Vce between positive and negative terminals of both switching element Q2 and Q3 exceed a threshold voltage level during a period of there ON-states, it can be judged with the flywheel diode D4 or the switching element Q4 having changed into the short circuit state.

As explained above, when any one of the flywheel diodes or the switching elements in a switching leg change into a short circuit state, any two of the voltages Vce between positive and negative terminals of switching elements surely exceed a threshold voltage level during a period of there ON-states. Therefore, if it uses combining the voltage detector shown in FIG. 2 and the logic operation circuit shown in FIG. 3, detection of the over-current failure of the flywheel diode or the switching element in a switching leg could be attained.

The logic operation circuit 7 of FIG. 3 was constituted so that the over-current failure could be detected when any two or more voltages Vce in the switching elements exceed a threshold voltage level during a period of there ON-states. If it constitutes so that the over-current failure may be detected when two voltages Vce of switching elements adjoined in a switching leg exceed a threshold voltage level during a period of there ON-states, as the failure mode analysis was performed in FIGS. 4 to 7, it is clear that a more reliable detection of the over-current failure could be attained.

SECOND EMBODIMENT

Figure 8:
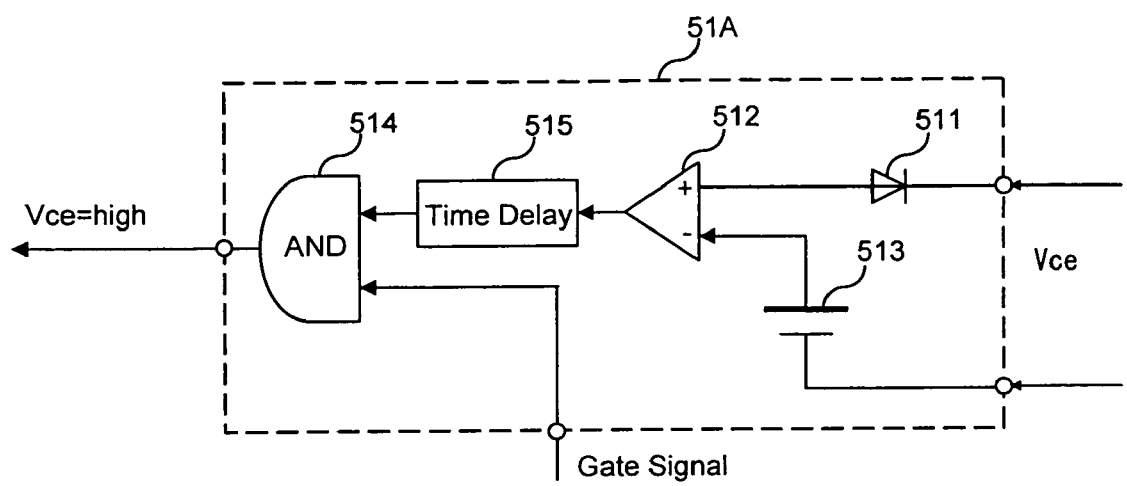
FIG. 8 shows an internal circuit diagram of a voltage detector applied to a second embodiment of a multi-level power converter according to the present invention.

With reference to FIGS. 8 to 11, a multi-level power converter of a second embodiment according to the invention is explained. FIG. 8 shows an internal circuit diagram of a voltage detector 51A applied to the second embodiment of the multi-level power converter according to the present invention.

To the same parts of the second embodiment as those shown in the circuit diagram of the voltage detector 51 relating to the first embodiment shown in FIG. 2, the same numerals are assigned and the explanation thereof will be omitted. In the second embodiment, a time delay circuit 515 is inserted at the output side of the comparator 512 in the voltage detector 51A and the output of the time delay circuit 515 might be given to AND circuit 514.

As mentioned above, the time delay circuit 515 protects an incorrect detection during a transient state when the switching element Q1 turns on. Since voltage Vce is over the threshold level irrespective of an existence of the over-current failure in the transient state, it causes error detection in the case of second embodiment.

In the case of the second embodiment, a composition of the voltage detector 51A should be applied to the voltage detector 51 and 54 for both end switching elements of the switching leg in FIG. 1, and a composition of the voltage detector without delay shown in FIG. 2 should be applied to the switching elements of middle part.

Figure 9:
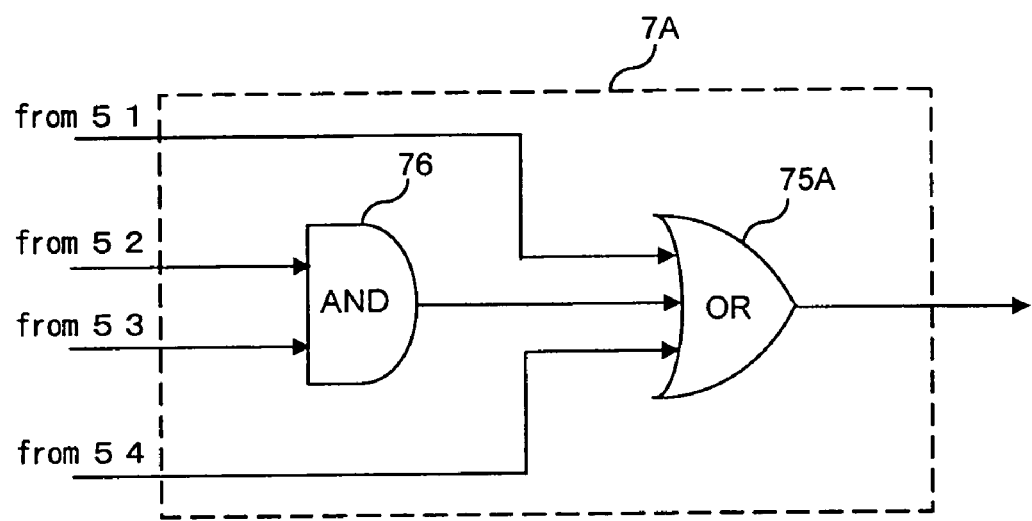
FIG. 9 shows a circuit diagram of a logic operation circuit applied to the second embodiment of a multi-level power converter according to the present invention.

FIG. 9 shows an internal circuit diagram of a logic operation circuit 7A used for a power converter concerning the second embodiment of this invention. As shown in FIG. 9, output signals from the voltage detector 51 and 54 are given to an OR circuit 75A directly. Output signals from the voltage detector 52 and 53 are given to an AND circuit 76, and an output signal from the AND circuit 76 is given to OR circuit 75A. It is constituted so that the output from the OR circuit 75A, Device Fault Signal may turn into an output from the logic operation circuit 7A.

Hereafter, with reference to the short circuit modal analysis figure of FIGS. 10 and 11, operation principle of the second embodiment will be explained.

Figure 10:
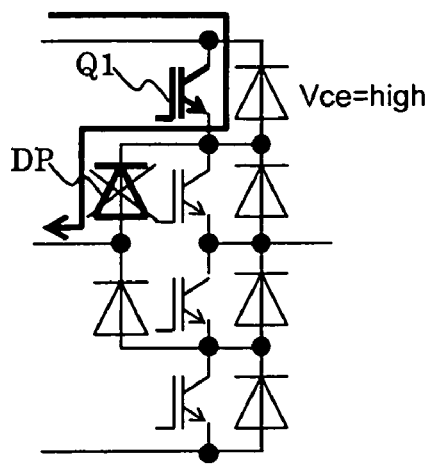
FIGS. 10 to 11 show short circuit modal analysis diagrams relating the second embodiment of a multi-level power converter of the present invention.

FIG. 10 shows the current route of a short circuit current when the clamp diode DP in a switching leg changes into a short circuit state. As shown in FIG. 10, when the switching element Q1 turns on, a short circuit current flows by the route of +E potential terminal to Q1, DP, and 0 potential terminal. Therefore, when the voltage Vce of the switching element Q1 exceeds a threshold voltage level during a period of its ON-state, it can be judged with the clamp diode DP having changed into the short circuit state.

Figure 11:
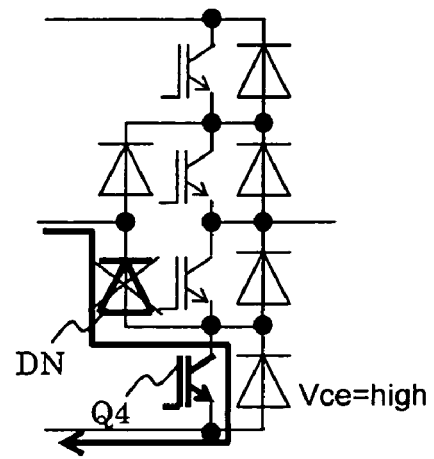

FIG. 11 shows the current route of a short circuit current when the clamp diode DN in a switching leg changes into a short circuit state. As shown in FIG. 11, when the switching element Q4 turns on, a short circuit current flows by the route of 0 potential terminal to DN, Q4, and −E potential terminal. Therefore, when the voltage Vce of the switching element Q4 exceeds a threshold voltage level during a period of its ON-state, it can be judged with the clamp diode DN having changed into the short circuit state.

According to the short circuit modal analysis shown by FIGS. 10 and 11, what is necessary to detect the over-current failure of a clamp diode, is just to detect that any one of the voltage Vce of both ends of switching elements exceeding the threshold voltage level during a period of there ON-states.

Therefore, when any one of all main circuit elements containing clamp diodes in the switching leg makes over-current failure, it turns out that the voltage Vce of switching element Q1 or Q4 becomes high during a period of its ON-state, or both voltages Vce of switching elements Q2 and Q3 become high simultaneously during a period of there ON-states.

Using the circuit 7A shown in FIG. 6, it will become possible to detect an over current failure more quickly when main circuit element having changed into the short circuit state. When the voltage Vce of the switching element Q1 becomes high at its ON-state, it might be occurred that the switching element Q3 or the flywheel diode D3, or the clamp diode DP changed into the short circuit state. When the voltage Vce of the switching element Q4 becomes high at its ON-state, it might be occurred that the switching element Q2 or the flywheel diode D2, or the clamp diode DN changed into the short circuit state. And when the voltages Vce of the switching elements Q2 and Q3 become high at there ON-states simultaneously, it might be occurred that the switching element Q1 or the flywheel diode D1, or the switching element Q4 or the flywheel diode D4 changed into the short circuit state.

THIRD EMBODIMENT

Figure 12:
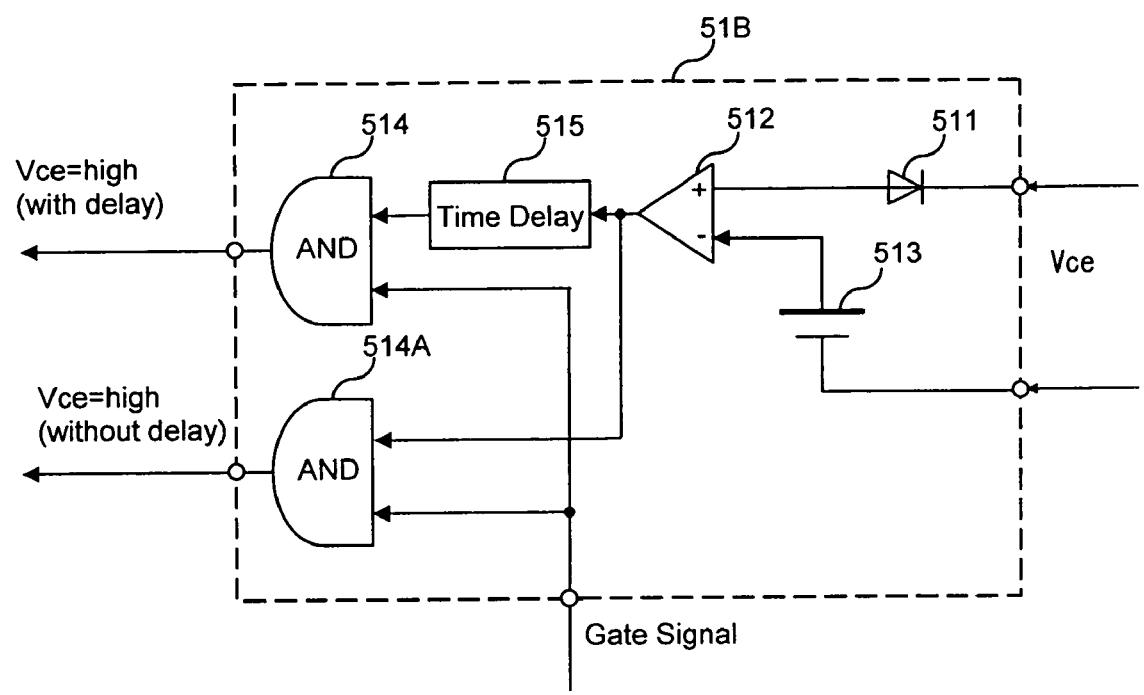
FIG. 12 shows an internal circuit diagram of a voltage detector applied to a third embodiment of a multi-level power converter according to the present invention.
Figure 13:
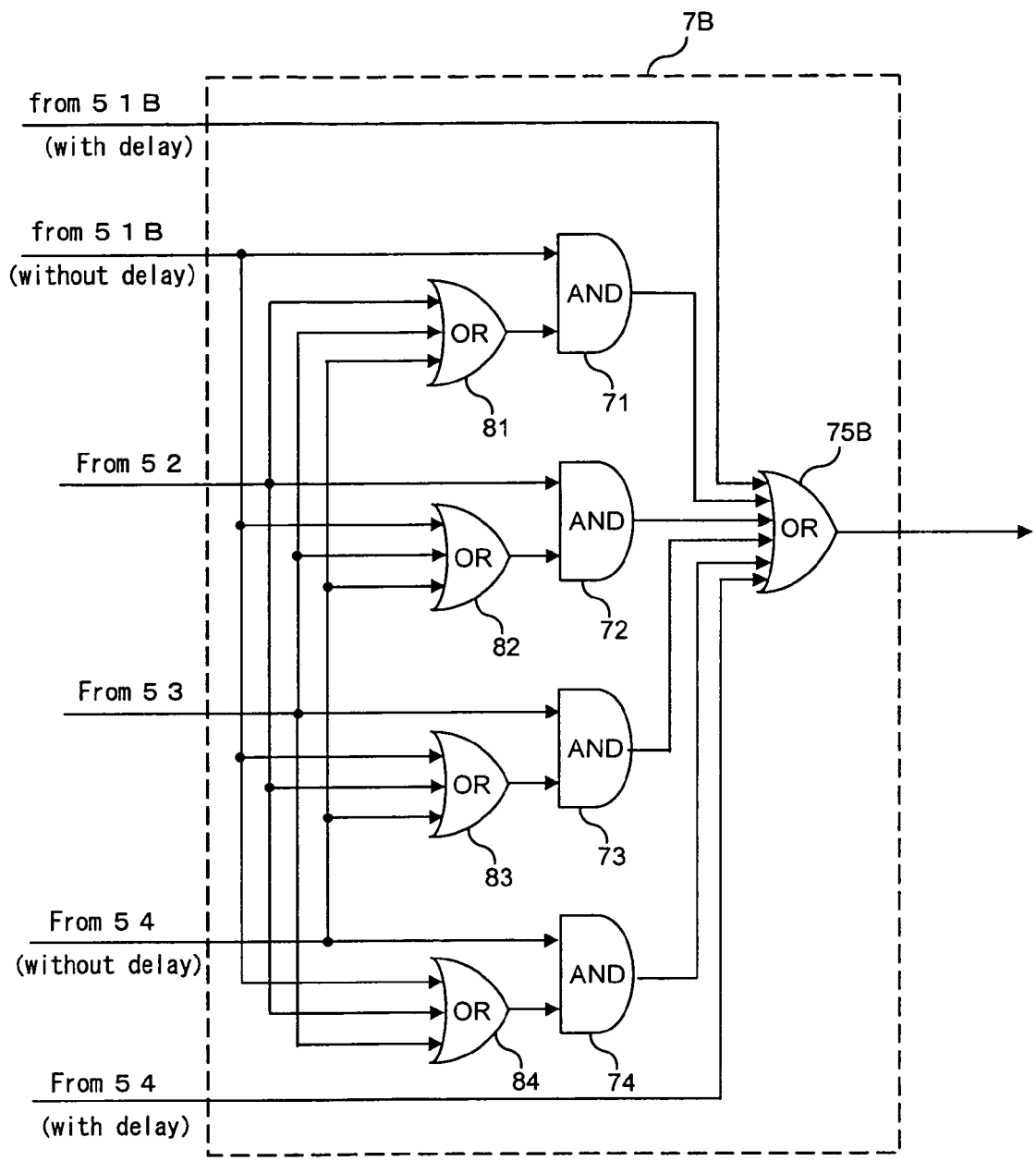
FIG. 13 shows a circuit diagram of a logic operation circuit applied to the third embodiment of a multi-level power converter according to the present invention.

With reference to FIGS. 12 and 13, a multi-level power converter of a third embodiment according to the invention is explained. FIG. 12 shows an internal circuit diagram of a voltage detector 51B applied to the third embodiment of the multi-level power converter according to the present invention.

To the same parts of the third embodiment as those shown in the circuit diagram of the voltage detector 51A relating to the second embodiment shown in FIG. 8, the same numerals are assigned and the explanation thereof will be omitted. In the third embodiment, an AND circuit 514A is added to the voltage detector 51A relating to the second embodiment shown in FIG. 8. A direct output signal from the comparator 512 and the gate signal are inputted to the AND circuit 514A.

Therefore, a voltage detector 51B outputs two signals with time delay and without time delay as the voltage Vce "high" signal of the switching element during a period of its ON-state. In the case of the third embodiment, a composition of the voltage detector 51B which outputs these two signals should be applied to the voltage detector 51 and 54 for both end switching elements of the switching leg shown in FIG. 1.

FIG. 13 shows an internal circuit diagram of a logic operation circuit 7B used for the power converter according to the third embodiment of this invention. To the same parts of the third embodiment as those shown in the circuit diagram of the logic operation circuit 7 relating to the first embodiment shown in FIG. 3, the same numerals are assigned and the explanation thereof will be omitted. In the third embodiment, output signals with time delay of the voltage detector 51B and 54 are added to the input of OR circuit 75B.

Although the logic operation circuit 7A shown in FIG. 9 of the second embodiment is easily composed, since the voltage detector 51A with time delay is used for the both ends of a switching leg, time delay by the delay circuit 515 occurs when a switching element or a flywheel diode of the middle part of a switching leg made an over-current failure. If it is used as a failure detection combining the voltage detector 51B and the logic operation circuit 7B, it will become possible to detect an over-current failure without time delay even when a switching element or a flywheel diode of the middle part of switching leg made a short circuit failure.

FOURTH EMBODIMENT

Figure 14:
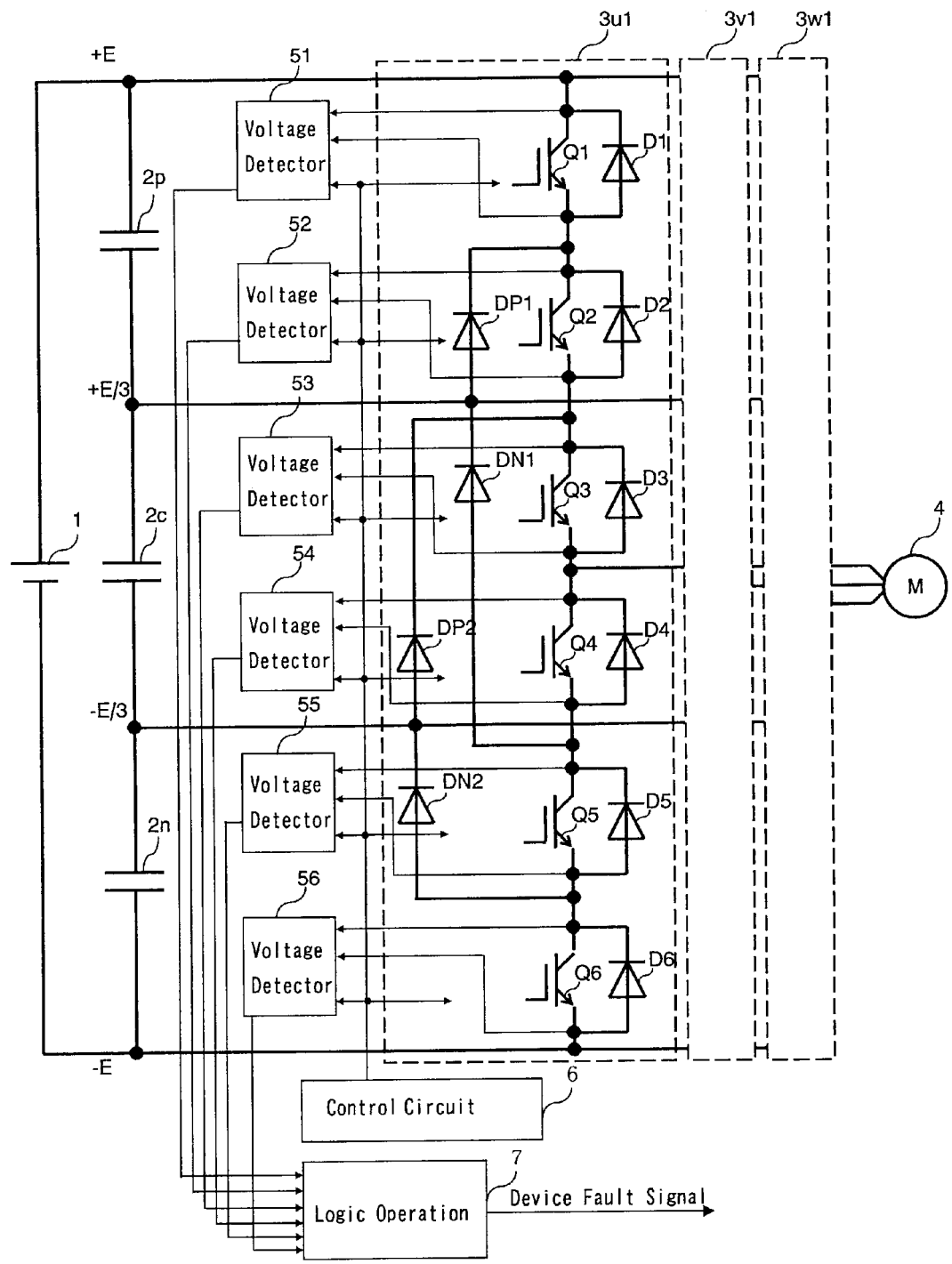
FIG. 14 shows a circuit diagram relating a fourth embodiment of a multi-level power converter of the present invention.

With reference to FIGS. 14 to 25, a multi-level power converter of a fourth embodiment according to the invention is explained. FIG. 14 shows a circuit diagram of the power converter relating to the fourth embodiment of the present invention.

To the same parts of fourth embodiment as those shown in the circuit diagram of the power converter relating to the first embodiment shown in FIG. 1, the same numerals are assigned and the explanation thereof will be omitted. As shown in FIG. 14, DC power supply 1 is divided into four-level DC voltage potential +E, +E/3, −E/3, and −E by capacitors 2P, 2C, and 2N. DC voltages which have potentials of four obtained levels are supplied to the switching legs $3u1$, $3v1$, and $3w1$. In FIG. 14, an internal composition of switching leg $3u1$ is illustrated. Since internal compositions of other switching legs $3v1$ and $3w1$ are fundamentally the same as that of switching leg $3u$, those illustrations and explanations are omitted.

Switching leg $3u1$ is composed of six switching elements Q1, Q2, Q3, Q4, Q5 and Q6 connected in-series by which diodes D1, D2, D3, D4, D5, and D6 are anti-parallel connected respectively, a clamp diode DP1 connected between a central point of the switching elements Q1 and Q2, and a central terminal of the capacitors $2p$ and $2c$, a clamp diode DN1 connected to between a central point of the switching elements Q4 and Q5, and the central terminal of the capacitors $2p$ and $2c$, a clamp diode DP2 connected between a central point of the switching elements Q2 and Q3, and a central terminal of the capacitors $2c$ and $2n$, and a clamp diode DN2 connected between a central point of the switching elements Q5 and Q6, and the central terminal of the capacitors $2c$ and $2n$.

A positive terminal of the switching element Q1 and a negative terminal of the switching element Q6 are connected to +E potential terminal and −E potential terminal of the DC power supply 1, respectively. The voltages Vce between positive and negative terminals of the switching elements Q1, Q2, Q3, Q4, Q5 and Q6 are given to the voltage detectors 51, 52, 53, 54, 55 and 56, respectively. Gate pulses for the switching elements are also supplied to these voltage detectors 51, 52, 53, 54, 55 and 56 from the control circuit 6. Outputs from the voltage detectors 51, 52, 53, 54, 55 and 56 are given to a logic operation circuit 7C.

The circuit composition figure of FIG. 14 changed three-level inverter equipment shown in FIG. 1 into four-level inverter equipment. In FIG. 10, the gate signal to each switching element given from the control circuit 6 is illustrated as a single track.

Hereafter, with reference to FIG. 14 and short circuit modal analysis figures of FIGS. 15 to 24, operation principle of the fourth embodiment will be explained.

Figure 15:
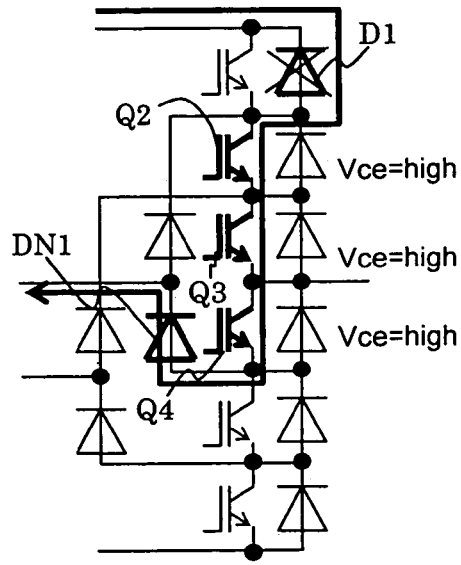
FIGS. 15 to 24 show short circuit modal analysis diagrams relating the fourth embodiment of a multi-level power converter of the present invention.

FIG. 15 shows the current route of a short-circuit current when the flywheel diode D1 in a switching leg changes into a short circuit state. Since a parallel connection of the flywheel diode D1 and the switching element Q1 is made, the following arguments are applied also when the switching element Q1 changes into a short circuit state.

As shown in FIG. 15, when the switching elements Q2, Q3, and Q4 are in there ON-states simultaneously, a short circuit current flows by the route of +E potential terminal to D1 (or Q1), Q2, Q3, Q4, DN1, and +E/3 potential terminal. Therefore, when the voltages Vce between positive and negative terminals of the switching elements Q1, Q2 and Q3 exceed a threshold voltage level during a period of there ON-states simultaneously, it can be judged with the flywheel diode D1 or the switching element Q1 having changed into the short circuit state.

Figure 16:
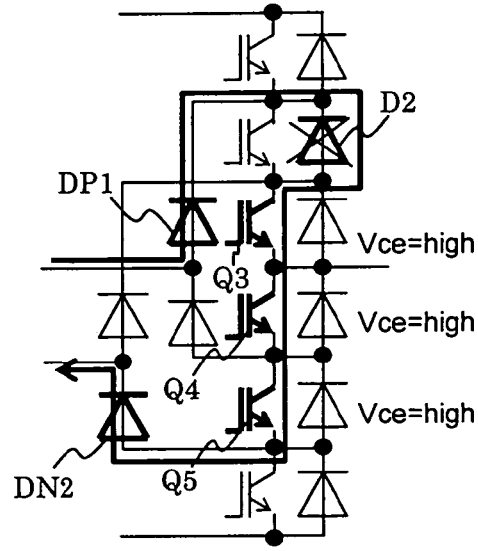

FIG. 16 shows the current route of a short-circuit current when the flywheel diode D2 or the switching element Q2 in a switching leg changes into a short circuit state. As shown in FIG. 16, when the switching elements Q3, Q4, and Q5 are in there ON-states simultaneously, a short circuit current flows by the route of +E/3 potential terminal to DP1, D1 (or Q1), Q3, Q4, Q5, DN2, and −E/3 potential terminal. Therefore, when the voltages Vce between positive and negative terminals of the switching elements Q3, Q4 and Q5 exceed a threshold voltage level during a period of there ON-states simultaneously, it can be judged with the flywheel diode D2 or the switching element Q2 having changed into the short circuit state.

Figure 17:
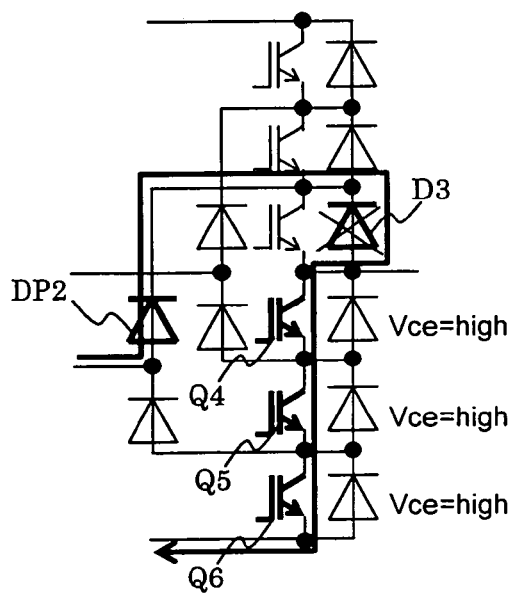

FIG. 17 shows the current route of a short-circuit current when the flywheel diode D3 or the switching element Q3 in a switching leg changes into a short circuit state. As shown in FIG. 17, when the switching elements Q4, Q5, and Q6 are in there ON-states simultaneously, a short circuit current flows by the route of −E/3 potential terminal to DP2, D3 (or Q3), Q4, Q5, Q6, and −E potential terminal. Therefore, when the voltages Vce between positive and negative terminals of the switching elements Q4, Q5 and Q6 exceed a threshold voltage level during a period of there ON-states simultaneously, it can be judged with the flywheel diode D3 or the switching element Q3 having changed into the short circuit state.

Figure 18:
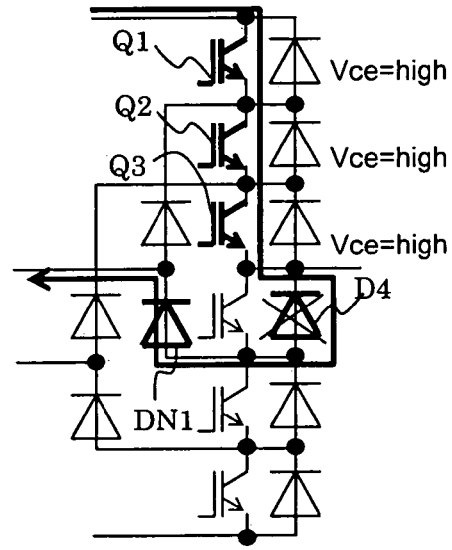

FIG. 18 shows the current route of a short-circuit current when the flywheel diode D4 or the switching element Q4 in a switching leg changes into a short circuit state. As shown in FIG. 18, when the switching elements Q1, Q2, and Q3 are in there ON-states simultaneously, a short circuit current flows by the route of +E potential terminal to Q1, Q2, Q3, D4 (or Q4), DN1, and +E/3 potential terminal. Therefore, when the voltages Vce between positive and negative terminals of the switching elements Q1, Q2 and Q3 exceed a threshold voltage level during a period of there ON-states simultaneously, it can be judged with the flywheel diode D4 or the switching element Q4 having changed into the short circuit state.

Figure 19:
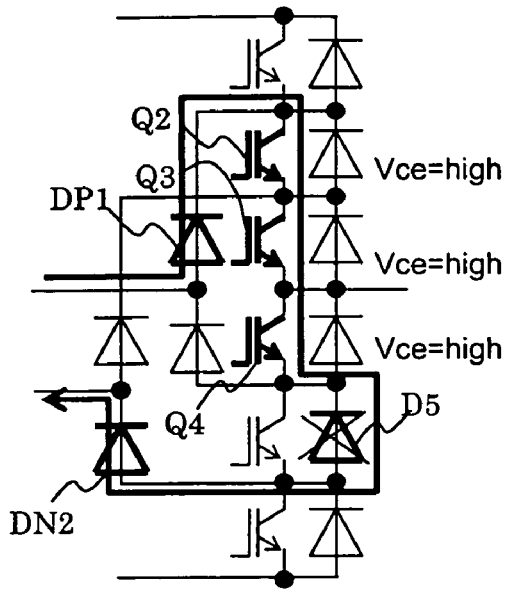

FIG. 19 shows the current route of a short-circuit current when the flywheel diode D5 or the switching element Q5 in a switching leg changes into a short circuit state. As shown in FIG. 19, when the switching elements Q2, Q3, and Q4 are in there ON-states simultaneously, a short circuit current flows by the route of +E/3 potential terminal to DP1, Q2, Q3, Q4, D5 (or Q5), DN2, and −E/3 potential terminal. Therefore, when the voltages Vce between positive and negative terminals of the switching elements Q2, Q3 and Q4 exceed a threshold voltage level during a period of there ON-states simultaneously, it can be judged with the flywheel diode D5 or the switching element Q5 having changed into the short circuit state.

Figure 20:
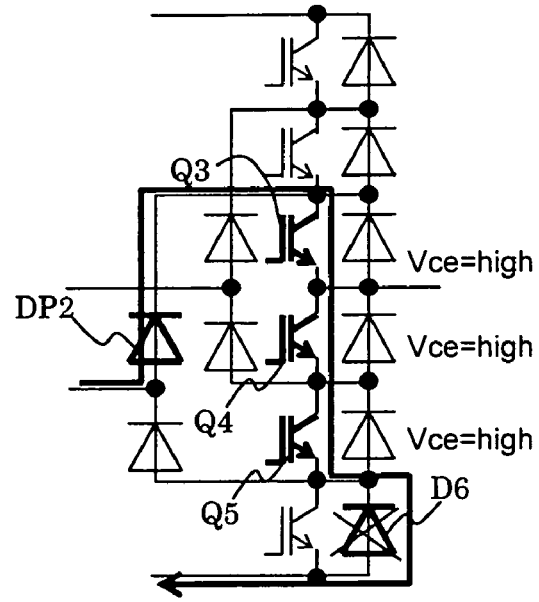

FIG. 20 shows the current route of a short-circuit current when the flywheel diode D6 or the switching element Q6 in a switching leg changes into a short circuit state. As shown in FIG. 20, when the switching elements Q3, Q4, and Q5 are in there ON-states simultaneously, a short circuit current flows by the route of −E/3 potential terminal to DP2, Q3, Q4, Q5, D6 (or Q6), and −E potential terminal. Therefore, when the voltages Vce between positive and negative terminals of the switching elements Q3, Q4 and Q5 exceed a threshold voltage level during a period of there ON-states simultaneously, it can be judged with the flywheel diode D6 or the switching element Q6 having changed into the short circuit state.

According to the short circuit modal analysis shown by FIGS. 15 to 20, to detect the over-current failure of arbitrary switching elements or flywheel diodes in a switching leg, what is necessary is just to detect that any three of voltages Vce of adjoining switching elements exceeding the threshold voltage level during a period of there ON-states simultaneously. Moreover, if it detects strictly in this way, the part which changed into the short circuit state may be specified. When this is extended to N-level inverter, wherein N is an Integer more than two, it turns out that what is necessary to detect the over-current failure of arbitrary switching element or flywheel diode in a switching leg is just to detect that the voltage Vce of (N-1) adjoining switching elements exceeding the threshold voltage level during a period of there ON-states simultaneously.

Although the above is the case of strict over-current failure detection, as the case of the first embodiment described, the detection could be simplified by supervising the voltage Vce of arbitrary two switching elements exceeding the threshold voltage level during a period of there ON-states simultaneously.

Figure 21:
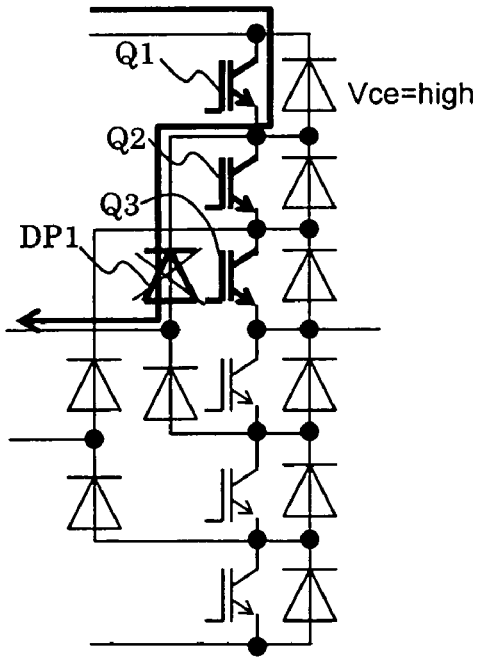

FIG. 21 shows the current route of a short circuit current when the clamp diode DP1 in a switching leg changes into a short circuit state. As shown in FIG. 21, when the switching element Q1 turns on, a short circuit current flows by the route of +E potential terminal to Q1, DP1, and +E/3 potential terminal. Therefore, when the voltage Vce of the switching element Q1 exceeds a threshold voltage level during a period of its ON-state, it can be judged with the clamp diode DP1 having changed into the short circuit state.

Figure 22:
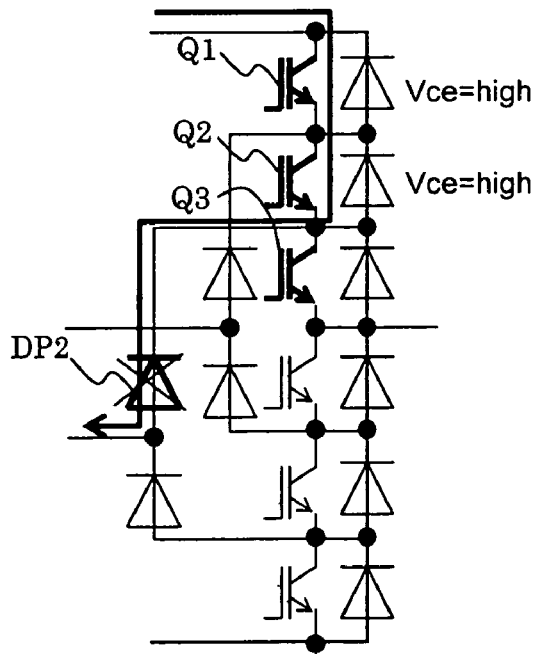

FIG. 22 shows the current route of a short circuit current when the clamp diode DP2 in a switching leg changes into a short circuit state. As shown in FIG. 22, when the switching elements Q1 and Q2 are in there ON-states simultaneously, a short circuit current flows by the route of +E potential terminal to Q1, Q2, DP2, and −E/3 potential terminal. Therefore, when the voltages Vce of the switching elements Q1 and Q2 exceed a threshold voltage level during a period of there ON-states simultaneously, it can be judged with the clamp diode DP2 having changed into the short circuit state.

Figure 23:
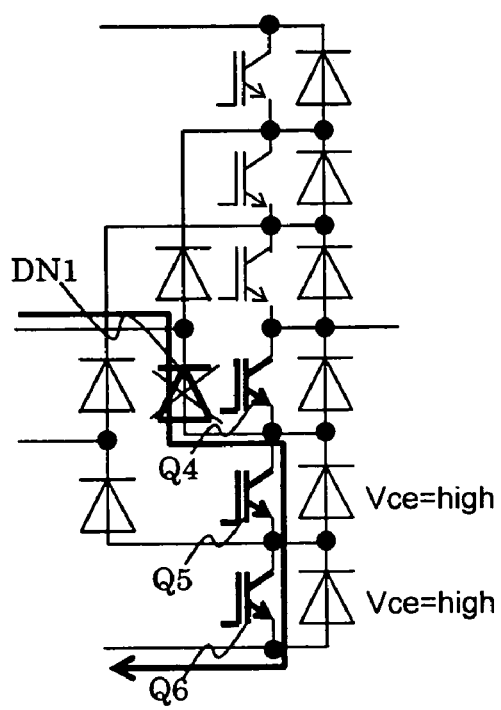

FIG. 23 shows the current route of a short circuit current when the clamp diode DN1 in a switching leg changes into a short circuit state. As shown in FIG. 23, when the switching elements Q5 and Q6 are in there ON-states simultaneously, a short circuit current flows by the route of +E/3 potential terminal to DN1, Q5, Q6, and −E potential terminal. Therefore, when the voltages Vce of the switching elements Q5 and Q6 exceed a threshold voltage level during a period of there ON-states simultaneously, it can be judged with the clamp diode DN1 having changed into the short circuit state.

Figure 24:
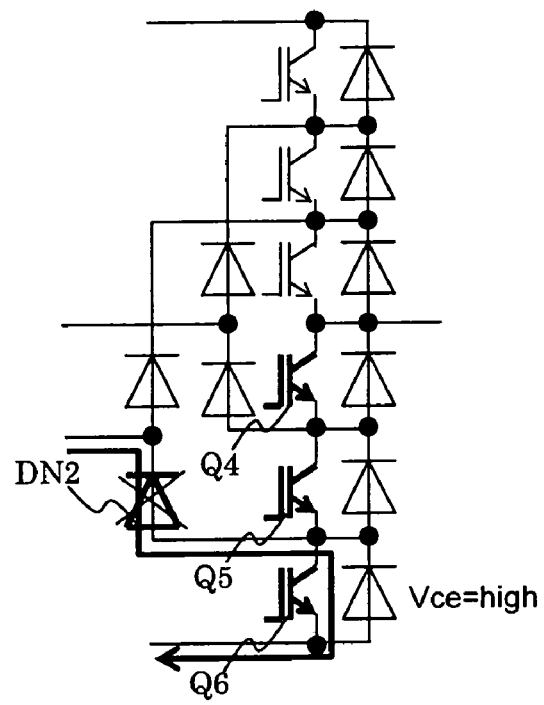

FIG. 24 shows the current route of a short circuit current when the clamp diode DN2 in a switching leg changes into a short circuit state. As shown in FIG. 24, when the switching element Q6 turns on, a short circuit current flows by the route of −E/3 potential terminal to DN2, Q6, and −E potential terminal. Therefore, when the voltage Vce of the switching element Q6 exceeds a threshold voltage level during a period of its ON-state, it can be judged with the clamp diode DN2 having changed into the short circuit state.

As mentioned above, it becomes possible like the case of three-level inverter in the second embodiment, what is necessary to detect the over-current failure of a clamp diode, is just to detect that any of the voltage Vce of both ends of switching element exceeding the threshold voltage level during a period of there ON-states.

If the voltages Vce of adjoined switching elements of both ends are also supervised during a period of there ON-states, the part which changed into a short circuit state may be specified. In the case of N-level inverter, the clamp diode which has made a short circuit failure may be specified by supervising voltages Vce of (N-3) adjoined switching elements of both ends.

Figure 25:
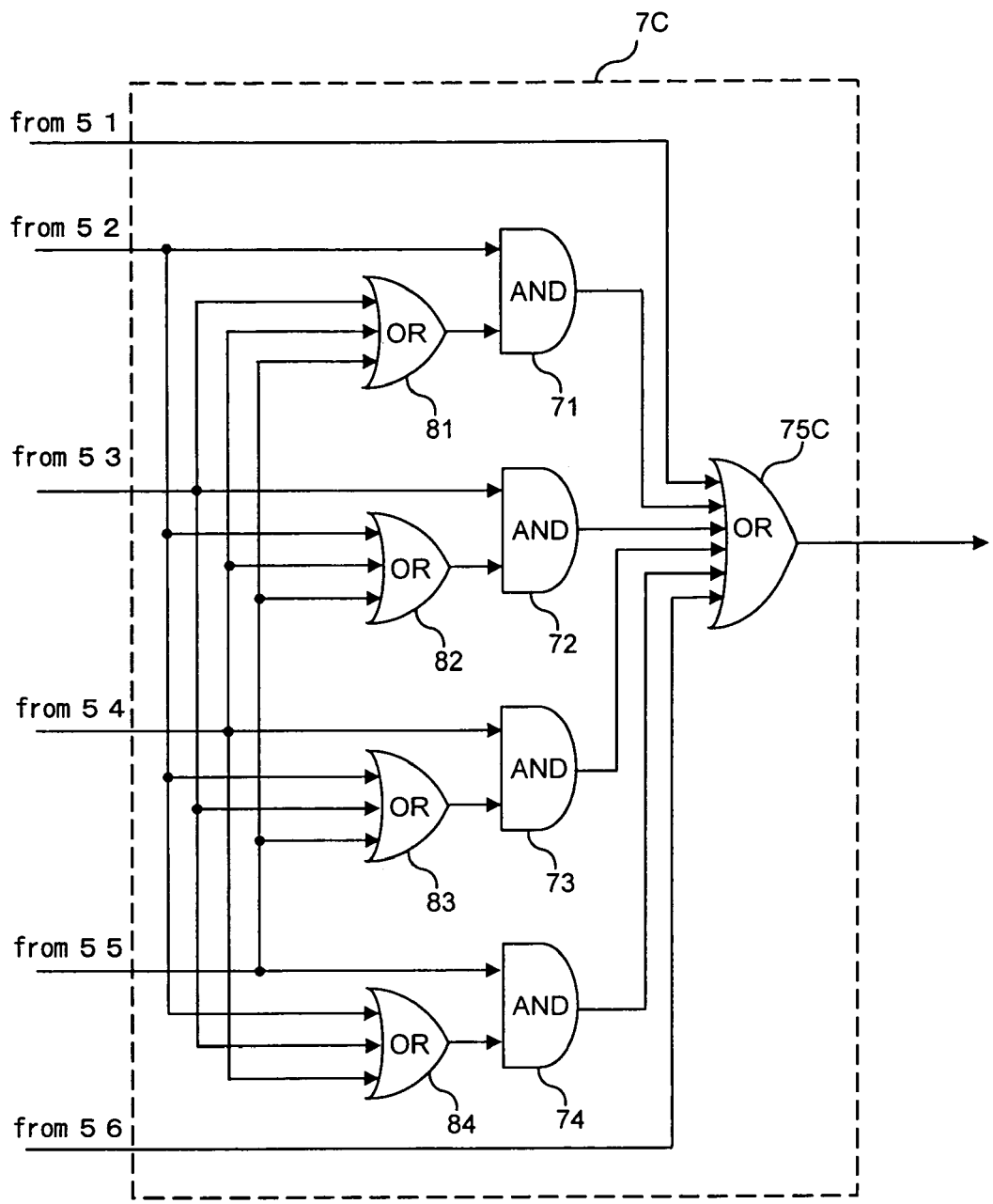
FIG. 25 shows a circuit diagram of a logic operation circuit applied to the fourth embodiment of a multi-level power converter according to the present invention.

FIG. 25 shows one example of the internal circuit diagram of a logic operation circuit 7C used for the power converter concerning the fourth embodiment of this invention. To the same parts of the fourth embodiment as those shown in the circuit diagram of the logic operation circuit 7 relating to the first embodiment shown in FIG. 3 the same numerals are assigned and the explanation thereof will be omitted.

In the forth embodiment, output signals from voltage detectors 52 to 54 are inputted to AND circuits 71 to 74 and OR circuits 81 to 84, and output signals from voltage detectors 51 and 56 are directly inputted to an OR circuit 75C.

A composition of the voltage detector 51A with time delay shown in FIG. 8 should be applied to the voltage detectors 51 and 56 for the switching element of both ends of a switching leg, and a composition of the voltage detector 51 without time delay shown in FIG. 2 should be applied to the voltage detectors 52 to 55 for the switching element of middle part of the switching leg.

According to the logic operation circuit 7C, same as the logic operation circuit 7A in three-level inverter shown in FIG. 9, it is possible to detect an over-current failure caused by any short circuit trouble among all main circuit elements.

If this is extended to a N-level inverter, detection of any over-current failure among main circuit elements will be attained by the detection of any of the voltages Vce of both ends switching element in a switching leg exceeding the threshold voltage level during a period of there ON-states, or any two or more voltages Vce of N middle part switching elements in a switching leg exceeding the threshold voltage level during a period of there ON-states.

Moreover, if the case of the operation in three-level inverter is extended to N-level inverter, over-current failure detection will be obtained more quickly by supervising any one of the voltage Vce of both ends of switching elements in a switching leg exceeding the threshold voltage level during a period of its ON-state with time delay detection, or two or more voltages Vce among middle part of the switching elements in a switching leg exceeding the threshold voltage level during a period of there ON-states without time delay detection.

Usually, when the over-current failure is detected, a gate pulse of the power converter is blocked, the breaker of the main circuit of the power converter may be switched off, and the power converter should be stopped running. If output signals from voltage detectors are memorized by certain memory means at this time, it might become possible to specify the part of main circuit element in the switching leg which might be changed into the short circuit

What is claimed is:

1. A multi-level power converter, comprising:
    a DC power source having N terminals with N-level voltage potentials, wherein N is an Integer more than two;
    a plurality of switching legs connected in parallel to the DC power source having,
    2(N-1) switching elements connected in series, and
    2(N-2) clamp diodes connected between (N-2) intermediate DC potential terminals and middle points of the switching legs respectively, in order to clamp the potential of the middle points of the switching legs;
    a control means for supplying gate pulses to the switching elements so that a N-level phase voltage may be obtained from a central point of each of the switching legs;
    a plurality of supervising means, each supervising means for supervising a respective of the switching elements to output a failure signal when a voltage between positive and negative terminals of the respective of the switching elements exceeds a predetermined threshold voltage level during a period of its ON-state, by inputting to an AND circuit the voltage and a gate pulse for switching the respective of the switching elements; and
    a logic operating means for detecting an over-current failure of main circuit elements to output a device fault signal using the failure signals from the plurality of supervising means;
    wherein an operation of the logic operating means at least includes AND condition of at least two failure signals to output the device fault signal.

2. A multi-level power converter according to claim 1, wherein the logic operating means outputs the device fault signal when any two of the failure signals are inputted.

3. A multi-level power converter according to claim 1, wherein each supervising means for supervising both ends of the switching elements has a predetermined time delay when the switching element turns on, and the logic operating means outputs the device fault signal when any one of the failure signals from both ends of the switching elements is inputted.

4. A multi-level power converter according to claim 1, wherein the logic operating means outputs the device fault signal when any (N-1) of adjoined switching elements in the switching leg are inputted.

5. A multi-level power converter according to claim 1, when the logic operating means outputs the device fault signal, operation of the power converter should be stopped.

6. A multi-level power converter according to claim 1, wherein a Diode is connected in anti-parallel to each of the switching elements, respectively.

7. A multi-level power converter, comprising:
    a DC power source having N terminals with N-level voltage potentials, wherein N is an Integer more than two;
    a plurality of switching legs connected in parallel to the DC power source having,
    2(N-1) switching elements connected in series, and
    2(n-2) clamp diodes connected between (N-2) intermediate DC potential terminals and middle points of the switching legs respectively, in order to clamp the potentials of the middle points of the switching legs;
    a controller to supply gate pulses to the switching elements so that a N-level phase voltage may be obtained from a central point of each of the switching leg;
    a plurality of supervising devices, each supervising device to supervise a respective of the switching elements to output a failure signal when a voltage between positive and negative terminals of the respective of the switching element exceeds a predetermined threshold voltage level during a period of its ON-state, by inputting to an AND circuit the voltage and a gate pulse for switching the respective of the switching elements; and
    a logic operating device to detect an over-current failure of main circuit elements to output a device fault signal using the failure signals from the plurality of supervising devices;

wherein an operation of the logic operating device at least includes AND condition of at least two failure signals to output the device fault signal.

8. A multi-level power converter according to claim 7, wherein the logic operating device outputs the device fault signal when any two of the failure signals are inputted.

9. A multi-level power converter according to claim 7, wherein each supervising device for supervising both ends of the switching elements has a predetermined time delay when the switching element turns on, and the logic operating device outputs the device fault signal when any one of the failure signals from both ends of the switching elements is inputted.

10. A multi-level power converter according to claim 7, wherein the logic operating device outputs the device fault signal when any (N-1) of adjoined switching elements in the switching leg are inputted.

11. A multi-level power converter according to claim 7, when the logic operating device outputs the device fault signal, operation of the power converter should be stopped.

12. A multi-level power converter according to claim 7, wherein a Diode is connected in anti-parallel to each of the switching elements, respectively.

13. A three-level power converter, comprising:
a DC power source having three terminals with three-level voltage potentials,
a plurality of switching legs connected in parallel to the DC power source having,
four switching elements connected in series,
a positive clamp diode connected between intermediate DC potential terminal and negative terminal of a positive end switching element, and
a negative clamp diode connected between intermediate DC potential terminal and positive terminal of a negative end switching element;
a control means for supplying gate pulses to the switching elements so that a three-level phase voltage may be obtained from a central point of each of the switching legs;
a plurality of supervising means, each supervising means for supervising a respective of the switching elements to output a failure signal when a voltage between positive and negative terminals of the respective of the switching elements exceeds a predetermined threshold voltage level during a period of its ON-state, by inputting to an AND circuit the voltage and a gate pulse for switching the respective of the switching elements; and
a logic operating means for detecting an over-current failure of main circuit elements to output a device fault signal using the failure signals from the plurality of supervising means;
wherein an operation of the logic operating means at least includes AND condition of at least two failure signals to output the device fault signal.

14. A three-level power converter according to claim 13, wherein the logic operating means outputs the device fault signal when any two of the failure signals are inputted.

15. A three-level power converter according to claim 13, wherein each supervising means for supervising both ends of the switching elements has a predetermined time delay when the switching element turns on, and the logic operating means outputs the device fault signal when any one of the failure signals from both ends of the switching elements is inputted.

16. A three-level power converter according to claim 13, wherein the logic operating means outputs the device fault signal when any two of adjoined switching elements in the switching leg are inputted.

17. A three-level power converter according to claim 13, when the logic operating means outputs the device fault signal, operation of the power converter should be stopped.

18. A multi-level power converter according to claim 13, wherein a Diode is connected in anti-parallel to each of the switching elements, respectively.

* * * * *